US007868568B2

(12) United States Patent
Iesaki

(10) Patent No.: US 7,868,568 B2
(45) Date of Patent: Jan. 11, 2011

(54) MOTOR DRIVING DEVICE

(75) Inventor: Kenichi Iesaki, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 342 days.

(21) Appl. No.: 12/037,836

(22) Filed: Feb. 26, 2008

(65) Prior Publication Data

US 2008/0204491 A1 Aug. 28, 2008

(30) Foreign Application Priority Data

Feb. 28, 2007 (JP) ............................ 2007-049680
Feb. 28, 2007 (JP) ............................ 2007-049681

(51) Int. Cl.
*H02P 7/00* (2006.01)

(52) U.S. Cl. ........................ 318/280; 318/281; 318/739

(58) Field of Classification Search ................. 318/560, 318/565, 568.16, 568.18, 599, 603, 652, 318/661, 54, 55, 700, 400.01, 400.14, 400.16, 318/280, 281, 284, 286, 434, 739
See application file for complete search history.

(56) References Cited

U.S. PATENT DOCUMENTS 4,928,050 A * 5/1990 Torisawa et al. ............ 318/696
6,538,407 B2 * 3/2003 Tanaka ........................ 318/445
6,756,760 B2 * 6/2004 Tanaka et al. ............... 318/560
6,781,341 B2 * 8/2004 Nakamichi et al. .......... 318/685
6,809,489 B1 * 10/2004 Yoshida et al. .............. 318/560
6,909,573 B2 6/2005 Kawabata et al.
2005/0057200 A1 * 3/2005 Akiyama ..................... 318/66

FOREIGN PATENT DOCUMENTS

| | | | |
|---|---|---|---|
| JP | 2004250133 | A | 9/2002 |
| JP | 3091271 | U | 1/2003 |
| JP | 2003079189 | A | 3/2003 |
| JP | 2003116297 | A | 4/2003 |
| JP | 2005094857 | A | 4/2005 |
| JP | 2006025497 | A | 1/2006 |
| JP | 2006050744 | A | 2/2006 |
| JP | 2006281553 | A | 10/2006 |
| JP | 2005262885 | A | 2/2008 |

* cited by examiner

*Primary Examiner*—Walter Benson
*Assistant Examiner*—Antony M Paul
(74) *Attorney, Agent, or Firm*—Baker Botts L.L.P.

(57) ABSTRACT

A motor driving device, which drives a DC motor, includes a motor driving unit, a status determination unit, and an initial value renewal unit. The motor driving unit repeatedly performs a change-over, wherein the motor driving unit changes an amount of a current inputted into the DC motor to an initial value at a predetermined timing, and then gradually increases the amount of the current from the initial value, in order to slowly move a driving target, driven by rotational force of the DC motor, in a moving direction. The status determination unit determines whether or not the driving target is in a predetermined status. The initial value renewal unit changes the initial value when the status determination unit determines that the driving target is in the predetermined status.

19 Claims, 13 Drawing Sheets

MOTOR DRIVING DEVICE

CROSS-REFERENCE TO RELATED APPLICATIONS

This application claims the benefit of Japanese Patent Applications No. 2007-049680 and No. 2007-049681 filed on Feb. 28, 2007 in the Japan Patent Office, the disclosure of which is incorporated herein by reference.

BACKGROUND

This invention relates to a motor driving device.

Conventionally, an image forming apparatus, which forms an image on a recording sheet by ejecting drops of ink from nozzles of a recording head, has been known. In this type of image forming apparatus, when an image forming process is performed, a carriage, carrying a recording head, is moved by a motor in a main scanning direction so as to convey the recording head in the main scanning direction, the recording head is simultaneously driven so as to eject drops of ink on a recording sheet, facing the recording head, and, as a result, an image is formed on the recording sheet.

Specifically, in this type of image forming apparatus, based on an output of an encoder, which detects the position of the carriage, the speed of the carriage in an image formation area is controlled at a constant speed by a feedback control method. Generally, in order to move the carriage to a home position, the motor control method is changed and the carriage is moved at a minimal speed.

In an inkjet image forming apparatus, a cap, which covers the nozzle surface of the recording head is generally disposed in the home position in order to inhibit the nozzle surface of the recording head from being dried. For a cap mechanism, a type of cap mechanism wherein the cap is conveyed to the nozzle surface of the recording head when the cap mechanism receives the pressing force from the carriage in correspondence with the movement of the carriage, is widely adopted. In an image forming apparatus configured as above, if the carriage is moved to the home position at a high speed, the cap is likely to strongly contact with the nozzle surface of the recording head and damage the nozzle surface. Therefore, in a conventional technique, the carriage is moved at a minimal speed when the carriage is moved to the home position.

Specifically, as a method for moving a carriage at a minimal speed, a method is known wherein a motor is driven such that the amount of current inputted into the motor is temporarily decreased to an initial value every time the carriage is moved forward for a predetermined distance, and then the amount of current is gradually increased from the initial value, so that the carriage is moved at a minimal speed. In this method, when a pulse signal is inputted from an encoder, for example, a process is performed wherein the carriage is determined to be moved forward, and the amount of the current is changed back to the initial value.

In a case wherein a cap mechanism is also operated by the driving force of a motor that drives a carriage, the load applied to the motor fluctuates when the carriage is in the vicinity of a position wherein the pressing force, generated in correspondence with the movement of the carriage, is applied to the cap mechanism. Specifically, the load increases while static frictional force acts on the cap mechanism, and decreases from the peak when the movement of the cap mechanism is initiated. Generally, a maintenance mechanism, which draws residual ink adhered to nozzles, is disposed below a cap. For the driving source of the maintenance mechanism, a motor for driving conveyance rollers is often used. In this type of image forming apparatus, a gear is switched by the pressing force, generated in correspondence with the movement of the carriage, and thereby the maintenance mechanism is driven. For example, a switching mechanism is disposed so as to be slidable with respect to a guide, which restricts the moving direction of the carriage. The pressing force, generated in correspondence with the movement of the carriage, is applied to the switching mechanism so as to drive the switching mechanism, and consequently to switch the gear connected to the motor. In such case, the load suddenly decreases from the peak, when the carriage is in the vicinity of a position wherein the pressing force, generated in correspondence with the movement of the carriage, is applied to the switching mechanism as much as to overcome the maximum frictional force of the switching mechanism and the movement of the switching mechanism is initiated. Moreover, the amount of the load fluctuation changes as the cap mechanism deteriorates with age. There has been a problem in a conventional apparatus that load fluctuation cannot be appropriately handled when the load fluctuation becomes large due to deterioration with age and the like of the cap mechanism and the above-described switching mechanism, and therefore the carriage sometimes cannot be appropriately moved at a minimal speed to the capping position.

Moreover, in a general image forming apparatus, a carriage is moved along a guide shaft. When the carriage is moved at a minimal speed along the guide shaft, carriage is sometimes held up with the guide shaft and a load fluctuation is caused. However, in a conventional apparatus, if a large load fluctuation is caused in such situation, the load fluctuation cannot be appropriately handled, and, in some cases, the carriage cannot be suitably moved at a minimal speed.

SUMMARY

One aspect of the present invention provides a motor driving device that can move a driving target at a minimal speed more appropriately irrespective of a load fluctuation as compared to a conventional motor driving device.

A motor driving device, which drives a DC motor, may include a motor driving unit, a status determination unit, and an initial value renewal unit. The motor driving unit repeatedly performs a change-over, wherein the motor driving unit changes an amount of a current inputted into the DC motor to an initial value at a predetermined timing, and then gradually increases the amount of the current from the initial value, in order to slowly move a driving target, driven by rotational force of the DC motor, in a moving direction. The status determination unit determines whether or not the driving target is in a predetermined status. The initial value renewal unit changes the initial value when the status determination unit determines that the driving target is in the predetermined status.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

Figure 1:
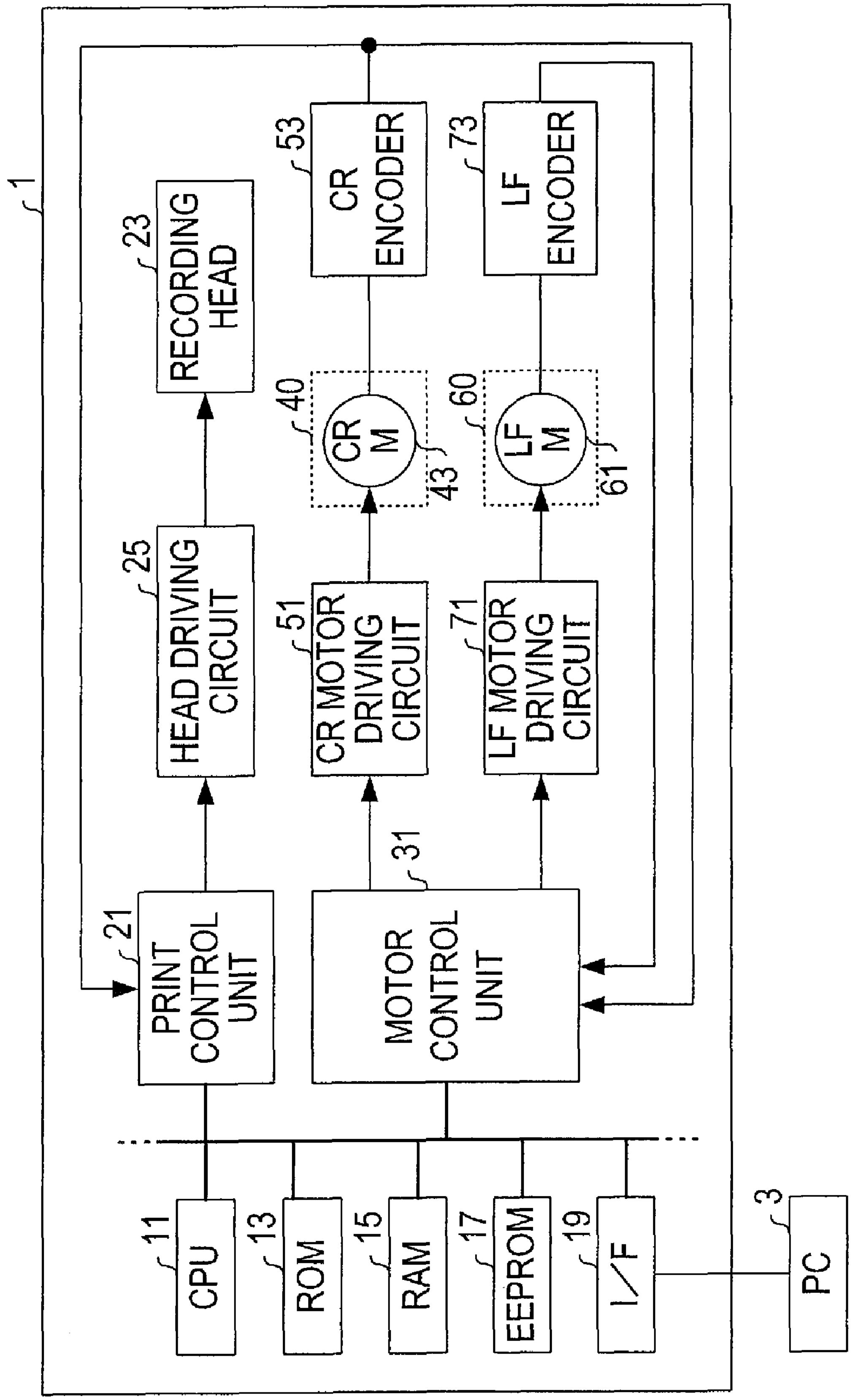
FIG. 1 is a block diagram showing the structure of a printer according to an embodiment of the present invention.

As shown in FIG. 1, the printer according to the present embodiment includes a CPU 11, a ROM 13, a RAM 15, an EEPROM 17, an interface 19, a print control unit 21, and a motor control unit 31. The ROM 13 stores programs executed by the CPU 11 and so on. The RAM 15 is used as an operation area when a program is executed. The EEPROM 17 stores setting information and so on. The interface 19 (such as a USB interface) is connected to a personal computer (PC) 3, and receives a print instruction, and print target data sent together with the print instruction from the PC 3.

The printer 1 further includes a recording head 23, a head driving circuit 25, a head conveyance mechanism 40, and a paper conveyance mechanism 60. The recording head 23 ejects drops of ink. The head driving circuit 25 is used so as to drive the recording head 23. The head conveyance mechanism 40 is constituted with a carriage 41, which carries the recording head 23 in a main scanning direction, a CR motor 43, used for moving the carriage 41 in the main scanning direction, and so on. The paper conveyance mechanism 60 is constituted with conveyance rollers (not shown), used for conveying paper to an ink ejection area, a LF motor 61, used for rotating the conveyance rollers, and so on. The CR motor 43 and the LF motor 61 are constituted with DC (direct current) motors.

Additionally, the printer 1 includes a CR motor driving circuit 51, a CR encoder 53, a LF motor driving circuit 71, and a LF encoder 73. The CR motor driving circuit 51 is used so as to drive the CR motor 43. The CR encoder 53 outputs pulse signals in correspondence with the position of the carriage 41 driven by the CR motor 43. The LF motor driving circuit 71 is used so as to drive the LF motor 61. The LF encoder 73 is constituted with a rotary encoder which outputs a pulse signal every time the LF motor 61 is rotated a predetermined angle.

Specifically, the recording head 23 is configured in the same manner as a known piezo inkjet head. That is, the recording head 23 is configured such that, when driving voltage is applied, a piezoelectric unit, disposed in adjacent to an ink reservoir, is deformed so as to change the volume of the ink reservoir, and ink contained inside of the ink reservoir is ejected from nozzles toward a sheet of paper. The recording head 23 includes nozzles 23C, 23M, 23Y, 23K so as to eject drops of inks in cyan (C), magenta (M), yellow (Y), and black (K) colors, and forms a color image on a sheet of paper by ejecting drops of inks of pertinent colors from the nozzles 23C, 23M, 23Y, 23K. The recording head 23 is mounted on the carriage 41 so as to be carried by the carriage 41, and is moved in the main scanning direction.

The head conveyance mechanism 40 is configured such that the carriage 41 is disposed so as to be movable along a guide shaft 42, and the carriage 41 is connected to an endless belt 44. The endless belt 44 is extended around a pulley 45, which is rotated upon receiving the driving force of the CR motor 43, and an idle pulley 46, and rotated upon receiving the driving force of the CR motor 43 through the pulley 45. In other words, the head conveyance mechanism 40 is configured such that, when the endless belt 44 is rotated by the rotational force of the CR motor 43, the carriage 41 is moved in the main scanning direction along the guide shaft 42. It is to be noted that, in the present embodiment, the side in which the idle pulley 46 is disposed is referred to as a front side (in the right side in FIGS. 2-4), and the side in which the pulley 45 is disposed is referred to as a rear side (in the left side in FIGS. 2-4).

Figure 2:
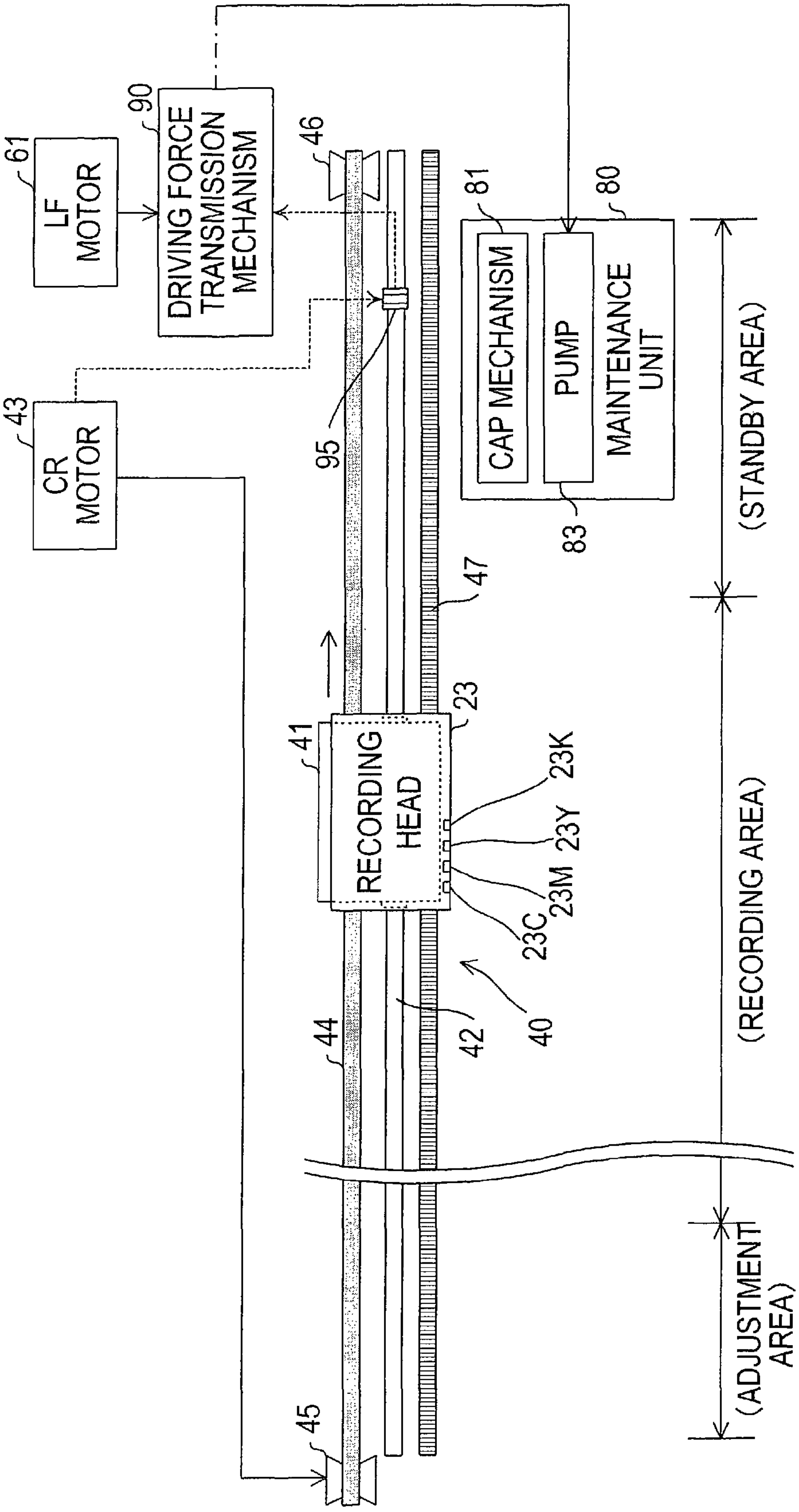
FIG. 2 is an explanatory view showing the structure of a head conveyance mechanism of the printer.

As shown in FIG. 2, the printer 1 is provided with a timing slit 47, on which slits are formed so as to have a uniform minute interval therebetween, along the guide shaft 42. A sensor element (not shown), which reads the intervals of the slits formed on the timing slit 47 and outputs a pulse signal in correspondence with the position of the carriage 41, is provided to the carriage 41. That is, in the present embodiment, the timing slit 47 and the sensor element constitute the CR encoder 53, which works as a linear encoder.

Figure 3:
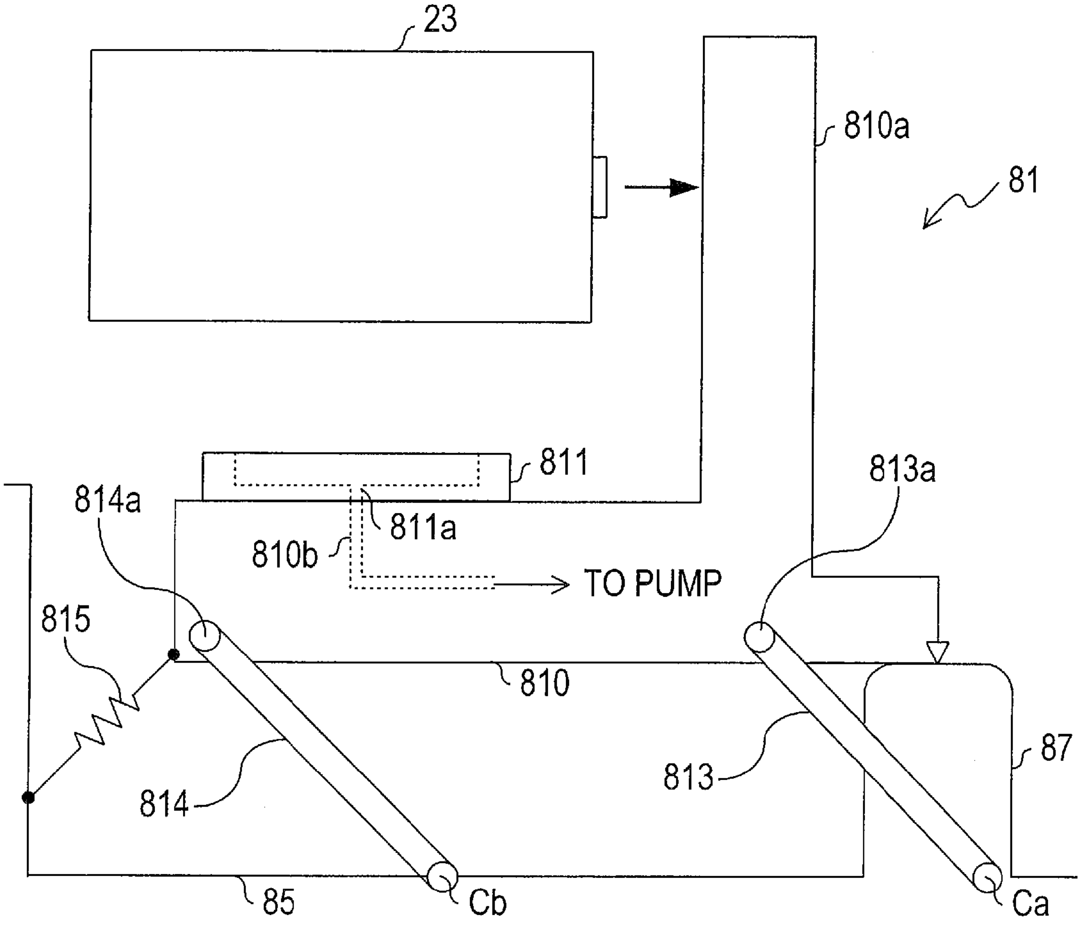
FIG. 3 is an explanatory view showing the structure of a cap mechanism of the printer, and a state immediately before the cap mechanism is contacted by a carriage of the printer.
Figure 4:
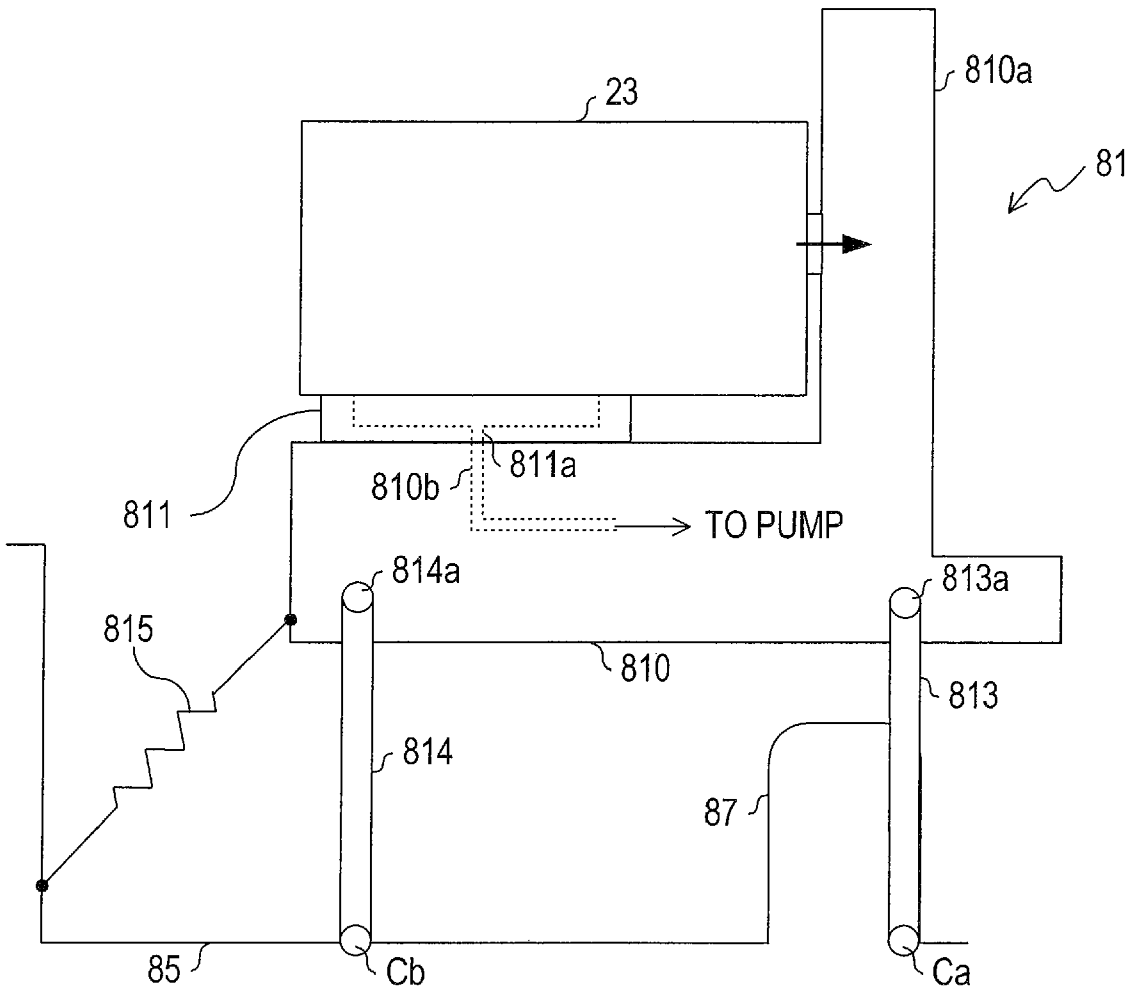
FIG. 4 is an explanatory view showing the structure of the cap mechanism, and a state wherein the cap mechanism is in contact with the carriage.

In the front end of the moving path of the carriage 41 along the guide shaft 42, a maintenance unit 80, including a cap mechanism 81 (see FIGS. 3, 4) and a pump 83, is disposed. The cap mechanism 81 is disposed in the upper portion of a maintenance frame 85 of the maintenance unit 80. The pump 83, used for drawing residual ink adhered to the nozzles 23C, 23M, 23Y, 23K of the recording head 23, is disposed in the lower portion of the maintenance frame 85. The cap mechanism 81 is configured as shown in FIGS. 3 and 4.

The cap mechanism 81 mainly includes a cap lift holder 810, a nozzle cap 811, and two pairs of links 813, 814. The links 813, 814 have equivalent lengths and are disposed in parallel to each other. The cap lift holder 810 is engaged with the maintenance frame 85 by a four-joint link mechanism constituted with the two pairs of links 813, 814.

In other words, one end of the link 813 is engaged with the cap lift holder 810 by an engagement portion 813*a*, whereas the other end is rotatably secured at a fixation point Ca of the maintenance frame 85. One end of the link 814 is engaged with the cap lift holder 810 by an engagement portion 814*a*, whereas the other end is rotatably secured at a fixation point Cb of the maintenance frame 85.

The maintenance unit 80 further includes a cap support portion 87, provided to the maintenance frame 85, so as to support the front bottom end of the cap lift holder 810. The rear bottom end of the cap lift holder 810 is connected to one end of a spring 815, another end of which is connected to the maintenance frame 85 in a position below the bottom surface of the cap lift holder 810. The spring 815 is disposed so as to apply a biasing force, which works obliquely downward to the rear direction, to the cap lift holder 810.

The cap lift holder 810 also includes a receiving board 810*a* disposed so as to stand upward in the front end portion of the cap lift holder 810. The receiving board 810*a* extends upward to a position so as to contact with the recording head 23, when the recording head 23 is moved forward. The cap lift holder 810 is lifted when the receiving board 810*a* receives the pressing force from the recording head 23.

That is, when the carriage 41 is moved forward along the main scanning direction, and the recording head 23 contacts with the receiving board 810*a*, pressing force is applied to the receiving board 810*a* by the carriage 41 and the recording head 23 being further moved forward. The movement of the cap lift holder 810 is restricted by being connected to the links 813, 814 which are rotated about the fixation points Ca, Cb. Therefore, the cap lift holder 810 is lifted while being moved forward.

When the carriage 41 and the recording head 23 are further moved forward, the links 813, 814 eventually stand upright (see FIG. 4). In this process, the nozzle cap 811, disposed on the top surface of the cap lift holder 810, is tightly attached to the peripheral of the nozzle surface of the recording head 23 while upward pressing force is applied thereto, surrounds the peripheral of the nozzle surface, and caps the nozzle surface.

Specifically, the nozzle cap 811, disposed on the top surface of the cap lift holder 810, is configured in a quadrate shape provided with a concave portion having a size corresponding to the size of the nozzle surface of the recording head 23. The nozzle cap 811 is made of silicon rubber. When the cap lift holder 810 is disposed in a standby position, which is the lowest position of the cap lift holder 810, while the cap lift holder 810 is supported by the cap support portion 87, the nozzle cap 811 is disposed in a position lower than the bottom surfaces of the recording head 23 and the carriage 41.

In a process wherein the cap lift holder 810 is pushed by the recording head 23 and displaced forward along a circular course, the position of the nozzle cap 811 ascends in conjunction with the movement of the recording head 23, and the top end of the nozzle cap 811 reaches and contacts the peripheral of the nozzle surface of the recording head 23. Subsequently, as the nozzle cap 811 is further lifted, the degree of tightness of the attachment with respect to the recording head 23 is gradually increased. Eventually, the nozzle surface of the recording head 23 is covered by the nozzle cap 811 in an air-tight manner in a capping position, and the recording head 23 is maintained in a capped state in the capping position.

The nozzle cap 811 and the cap lift holder 810 are respectively provided with discharge paths 811*a*, 810*b* connected to the pump 83. When the pump 83 is operated, ink adhered to the nozzles 23C, 23M, 23Y, 23K is drawn and discharged through the discharge path 811*a* of the nozzle cap 811 and the discharge path 810*b* of the cap lift holder 810. The maintenance unit 80 according to the present embodiment is operated as described above.

The pump 83 is configured so as to be operated upon receiving the driving force of the LF motor 61. The guide shaft 42 is provided with a pump operation member 95 (see FIG. 2) which can be slid along the guide shaft 42. The pump operation member 95 is disposed in a position Pz, which is located at a predetermined distance before the capping position where the carriage 41 stops when capping of the recording head 23 is completed.

The pump operation member 95 is pushed and moved by the recording head 23 when the carriage 41 is moved forward along the main scanning direction, and operates a driving force transmission mechanism 90 such that the driving force of the LF motor 61 is transmitted to the pump 83 when the recording head 23 reaches the capping position.

In other words, the driving force transmission mechanism 90 is configured so as to switch the connection of gears in correspondence with the movement of the pump operation member 95, and to connect the LF motor 61 to the pump 83 when the pump operation member 95 reaches the capping position together with the recording head 23.

The driving force transmission mechanism 90 is also configured so as to switch the connection of gears, when the CR motor 43 is rotated in a direction opposite to the rotational direction for moving the carriage 41 forward (a negative direction), so that the connection of the pump 83 and the LF motor 61 is disconnected. Although the detail is not shown in the drawings, the printer 1 according to the present embodiment is configured such that, when the carriage 41 is moved backward from the capping position, the pump operation member 95 returns to the initial position Pz.

Figure 5A:
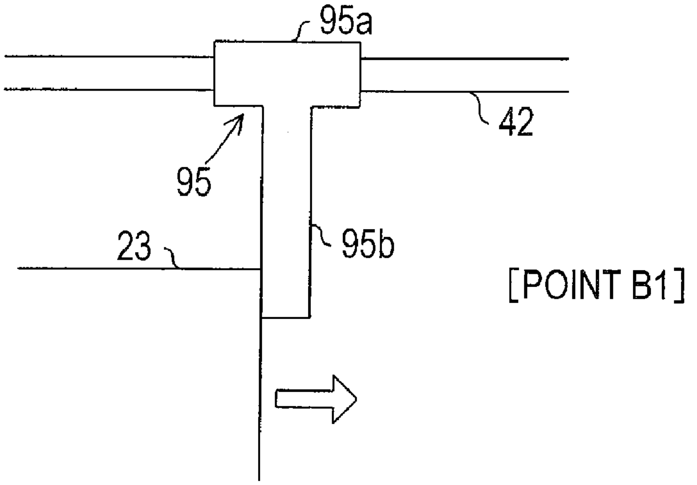
FIG. 5A is an explanatory view showing the structure of a pump operation member and a state in which a recording head contacts with the pump operation member.
Figure 5B:
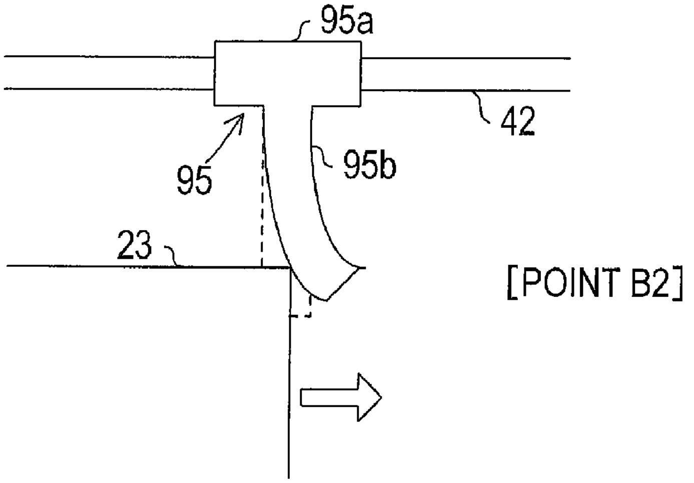
FIG. 5B is an explanatory view showing the structure of the pump operation member and a state in which the pump operation member is bent by the pressing force of the recording head.
Figure 5C:
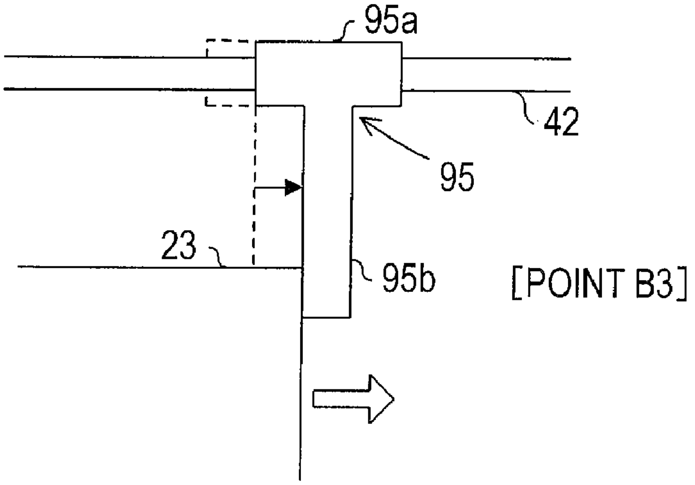
FIG. 5C is an explanatory view showing the structure of the pump operation member and a state after the pump operation member is moved forward.

As shown in FIGS. 5A-5C, the pump operation member 95 according to the present embodiment includes a cylinder portion 95*a*, through which the guide shaft 42 is inserted, and a contact portion 95*b* that receives the pressing force of the recording head 23. The pump operation member 95 is configured such that the contact portion 95*b*, formed in a plate shape, extends from the cylinder portion 95*a* in the vertical direction with respect to the guide shaft 42. The contact portion 95*b* is made with a plastic member which bends and absorbs an impact when the contact portion 95*b* contacts with the recording head 23.

In the process wherein the carriage 41 is moved forward, the pump operation member 95 contacts with the recording head 23 (see FIG. 5A), and then, upon receiving the pressing force of the recording head 23, bends in a stationary state without moving forward (see FIG. 5B). When the recording head 23 is further moved forward, due to the restoring force of the pump operation member 95 so as to be restored from the bending and the pressing force from the recording head 23, the pump operation member 95 is moved along the guide shaft 42 (see FIG. 5C). By going through such process, the pump operation member 95 is moved forward together with the recording head 23 along the guide shaft 42. In the present embodiment, due to the above-described movement of the pump operation member 95, the pump 83 is eventually operated.

The print control unit 21 is configured such that, when an operation is initiated by an instruction sent from the CPU 11, the print control unit 21 controls the recording head 23 through the head driving circuit 25 based on a pulse signal inputted from the CR encoder 53 and image data inputted from the CPU 11, and forms an image according to the image data inputted from the CPU 11 on a sheet of paper by using the recording head 23. Specifically, in the same manner as in a known printer, the print control unit 21 applies driving voltage to the recording head 23 in accordance with the movement of the carriage 41 based on the pulse signal inputted from the CR encoder 53, and makes the recording head 23 eject drops of ink from the nozzles 23C, 23M, 23Y, 23K so as to form an image on a sheet of paper.

Figure 6:
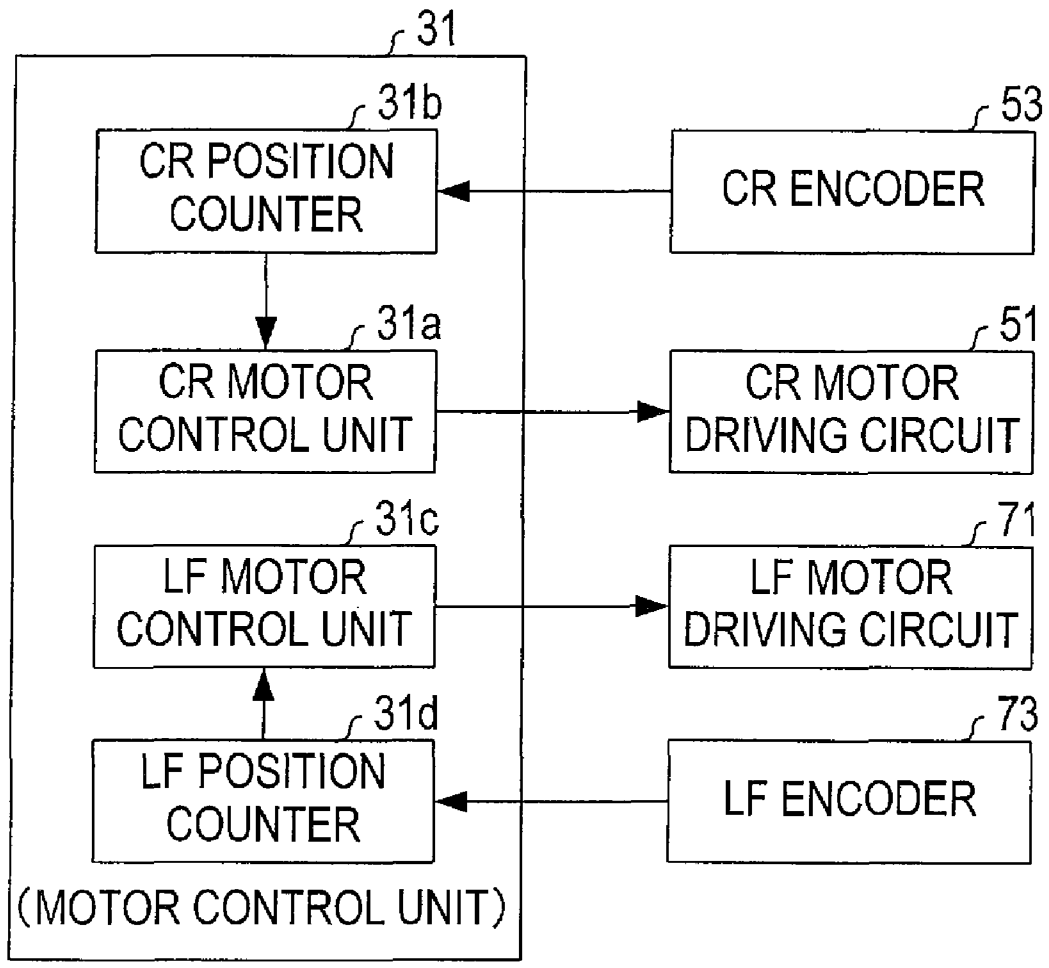
FIG. 6 is a block diagram showing the structure of a motor control unit of the printer.

As shown in FIG. 6, the motor control unit 31 includes a CR motor control unit 31*a*, a CR position counter 31*b*, a LF motor control unit 31*c*, and a LF position counter 31*d*. The motor control unit 31 is configured such that the CR motor control unit 31*a* controls the CR motor 43, and the LF motor control unit 31*c* controls the LF motor 61. In other words, in the present embodiment, the CR motor 43 and the LF motor 61 can be controlled in the following manner: the motor control unit 31 sets an amount I of the current, inputted into the motors 43, 61, with respect to the CR motor driving circuit 51 and the LF motor driving circuit 71, and the CR motor driving circuit 51 and the LF motor driving circuit 71 drive the CR motor 43 and the LF motor 61 by the current in the amount I set as above.

Specifically, when an instruction for initiating an image formation process is inputted from the CPU 11, the CR motor control unit 31*a* controls the CR motor 43 based on a positional coordinate of the carriage 41, which is obtained from the CR position counter 31*b*, so that the carriage 41 is moved in the following manner.

That is, when an instruction for initiating the image formation process is inputted from the CPU 11, the CR motor control unit 31*a* moves the carriage 41 backward from the capping position, which is the home position of the carriage 41, to the beginning point of an adjustment area (see FIG. 2), which is located in an opposite side of the capping position. Subsequently, the CR motor control unit 31*a* moves the carriage 41 forward such that the moving speed Vn of the carriage 41 is accelerated and reaches a target moving speed Vs, specified by the CPU 11, at the beginning point of a recording area (the end point of the adjustment area).

Moreover, the CR motor control unit 31*a* controls the CR motor 43 such that the carriage 41 is constantly moved in the recording area at the target moving speed Vs up to a position a predetermined distance before a target stop position specified by the CPU 11. When the carriage 41 reaches the position the predetermined distance before the target position, the CR motor control unit 31*a* controls the CR motor 43 such that the carriage 41 stops at the target stop position. When the carriage 41 stops at the target stop position, the CR motor control unit 31*a* moves the carriage 41 back to the beginning point of the adjustment area, and then moves the carriage 41 to the target stop position according to the above-described method.

The CR motor control unit 31*a* repeatedly performs such operation so as to reciprocate the carriage 41 until an instruction for terminating the image formation process is inputted from the CPU 11. In the process wherein the carriage 41 is moved forward, the print control unit 21 controls the recording head 23, and drops of ink are ejected on a sheet of paper, when the carriage 41 is in the recording area. By such operation, an image is formed on a sheet of paper in the printer 1 according to the present embodiment.

When an instruction for terminating the image formation process is inputted from the CPU 11, the CR motor control unit 31*a* moves the carriage 41 up to the end point of the recording area (the beginning point of a standby area), and stops the carriage 41. Then, the amount I of current inputted into the CR motor 43 is gradually increased, and thereby the carriage 41 is moved forward. Moreover, the CR motor control unit 31*a* controls the CR motor 43 in the following manner. Every time when the positional coordinate of the carriage 41, indicated by the CR position counter 31*b*, is increased by one, the CR motor control unit 31*a* determines that the carriage 41 is moved forward, temporarily reduces the amount I of the current inputted into the CR motor 43 to an initial value Ikeep, and then gradually increases the amount I from the initial value Ikeep. By such process, the CR motor control unit 31*a* moves the carriage 41 in the standby area up to the capping position at a minimal speed (see FIGS. 7-9, FIG. 12, and FIG. 13A, FIG. 13B, the detail will be explained later).

The CR position counter 31*b* is configured as follows. Based on pulse signals (A-phase signal, B-phase signal) outputted by the CR encoder 53, the CR position counter 31*b* detects the moving direction of the carriage 41, and detects that the carriage 41 is displaced for a predetermined distance (a slit interval L). The CR position counter 31*b* calculates the positional coordinate of the carriage 41 by incrementing the positional coordinate by 1 when the carriage 41 is moved forward for a predetermined distance, and decrementing the positional coordinate by 1 when the carriage 41 is moved backward for a predetermined distance.

The LF motor control unit 31*c* is configured so as to control the LF motor 61 in the following manners. If a paper feed instruction is inputted from the CPU 11 prior to an instruction for initiating the image formation process, the LF motor control unit 31*c* controls the LF motor 61 so as to convey the leading end of a sheet of paper to a predetermined position. Subsequently, when an instruction for initiating the image formation process is inputted, the LF motor control unit 31*c* controls the LF motor 61 so as to feed the sheet of paper for a predetermined distance every time the carriage 41 is moved in the main scanning direction up to the target stop position. Specifically, the LF motor control unit 31*c* controls the LF motor 61 by adjusting the amount I of the current inputted into the LF motor 61, based on the positional coordinate of a sheet of paper, which is indicated by the LF position counter 31*d*.

The LF position counter 31*d* is configured in the same manner as the CR position counter 31*b*. That is, based on pulse signals (A-phase signal, B-phase signal) outputted by the LF encoder 73, the LF position counter 31*d* detects the moving direction of a sheet of paper, and detects that the sheet of paper is displaced for a predetermined distance. The LF position counter 31*d* calculates the positional coordinate of a sheet of paper by incrementing the positional coordinate by 1 when the sheet of paper is moved forward for a predetermined distance, and decrementing the positional coordinate by 1 when the sheet of paper is moved backward for a predetermined distance. The positional coordinate obtained in the LF position counter 31*d* is reset when the leading end of a sheet of paper is detected by a sensor (not shown) disposed in a conveyance path of paper, and the original point of the positional coordinate is set.

The following describes a motor control process performed when the CR motor control unit 31*a* moves the carriage 41 from the beginning point of the standby area to the capping position. As described above, when the CR motor control unit 31*a* receives an instruction for terminating the image formation process and moves the carriage 41 to the end point of the recording area (the beginning point of the standby area), the CR motor control unit 31*a* subsequently initiates the motor control process, shown in FIG. 7, and moves the carriage 41 to the capping position at a minimal speed.

The reason for performing the above-mentioned motor control process from the beginning point of the standby area so as to move the carriage 41 at a minimal speed is that, if the recording head 23 is moved at a high speed when capping is performed with respect to the recording head 23, the nozzle cap 811 is likely to rub the nozzle surface of the recording head 23 hard, and to damage the nozzle surface.

Figure 7:
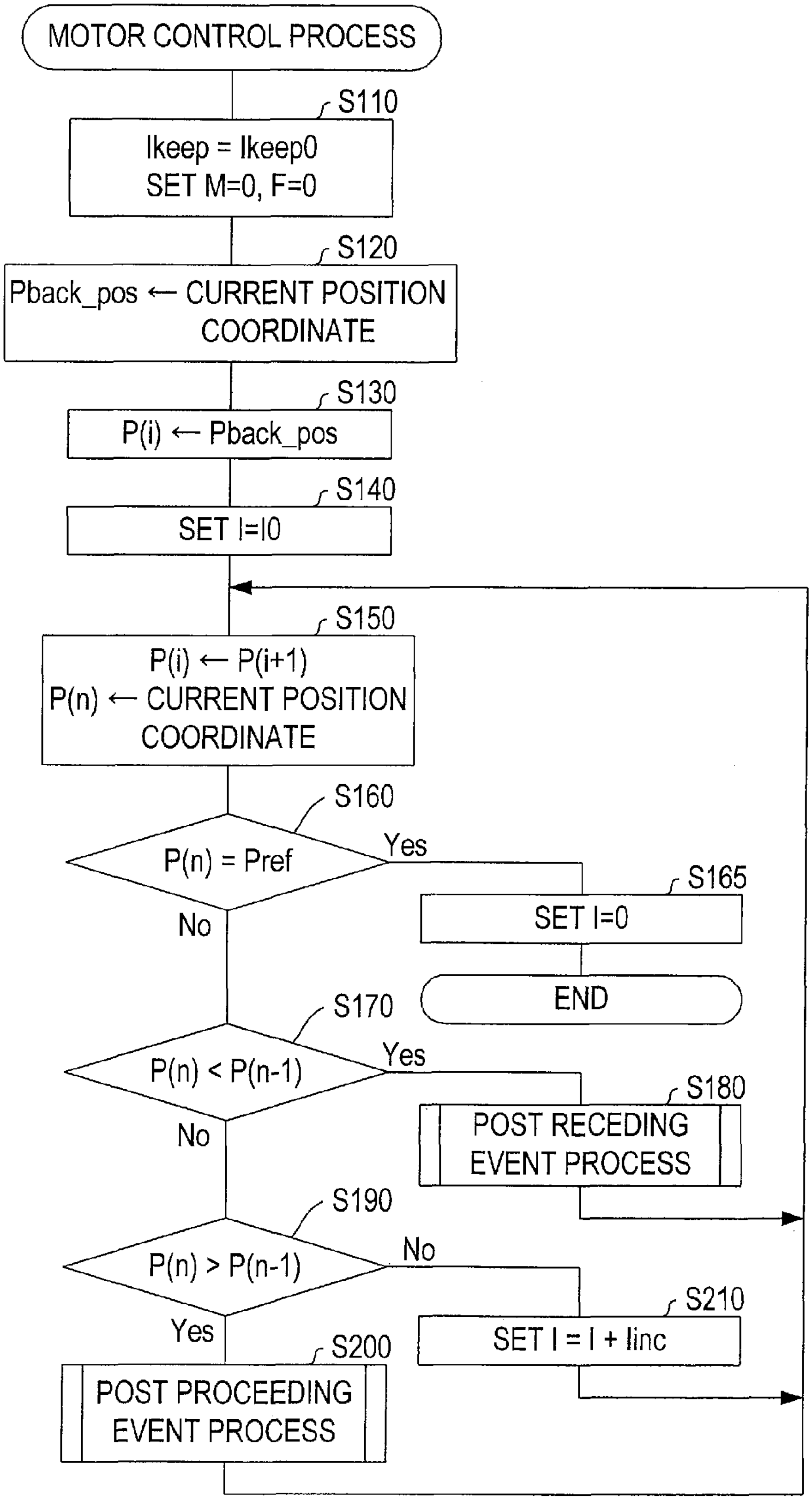
FIG. 7 is a flowchart describing a motor control process performed by a CR motor control unit of the printer.

In the printer 1 according to the present embodiment, the nozzle cap 811 is lifted and moved to the position where the nozzles are located due to the pressing force applied in correspondence with the movement of the recording head 23. Moreover, due to the pressing force applied in correspondence with the movement of the recording head 23, the pump operation member 95 is moved so as to operate the driving force transmission mechanism 90. Consequently, when the recording head 23 is moved to the capping position, a large fluctuation is caused in the load applied to the CR motor 43. The speed of the carriage 41 cannot be appropriately controlled in a simple motor control process because of the influence of the load fluctuation. Therefore, the motor control process shown in FIG. 7 is performed in the present embodiment so that the carriage 41 (the recording head 23) can be moved at a minimal speed even when a large load fluctuation is caused.

Figure 10:
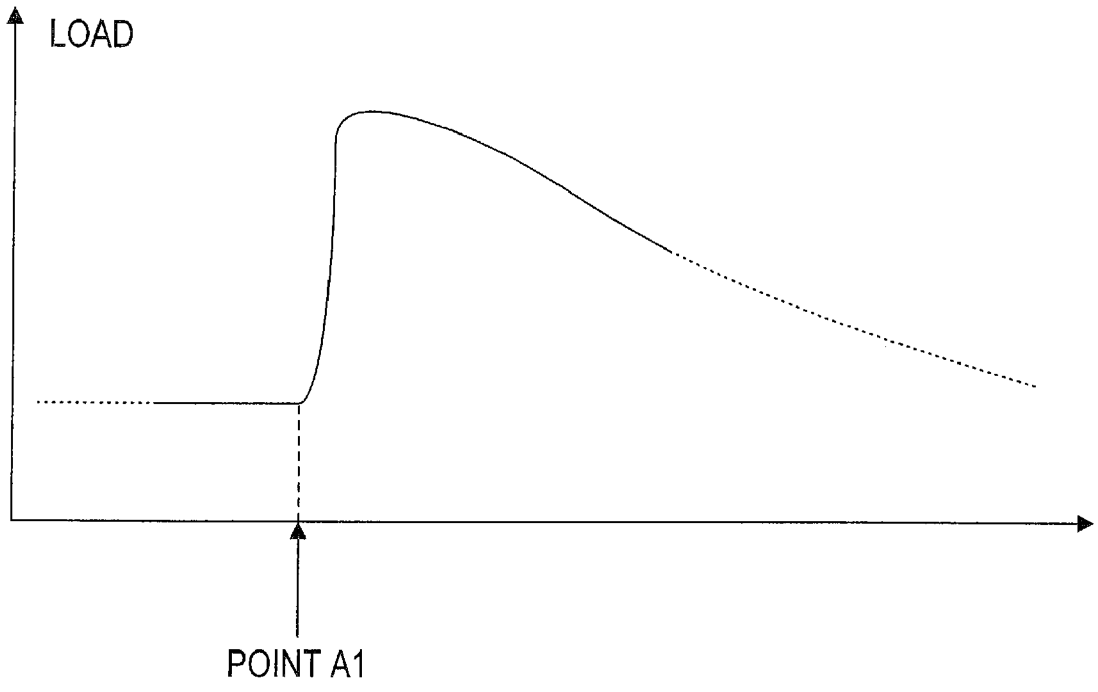
FIG. 10 is a graph showing a fluctuation of load applied to a CR motor when the recording head contacts with the cap mechanism and a nozzle cap is lifted.

As shown in FIG. 10, the load applied to the CR motor 43 hardly fluctuates before the carriage 41 reaches a point A1. Once the carriage 41 reaches the point A, wherein the recording head 23 contacts with the cap mechanism 81, and moved further forward, the load significantly increases.

Figure 11:
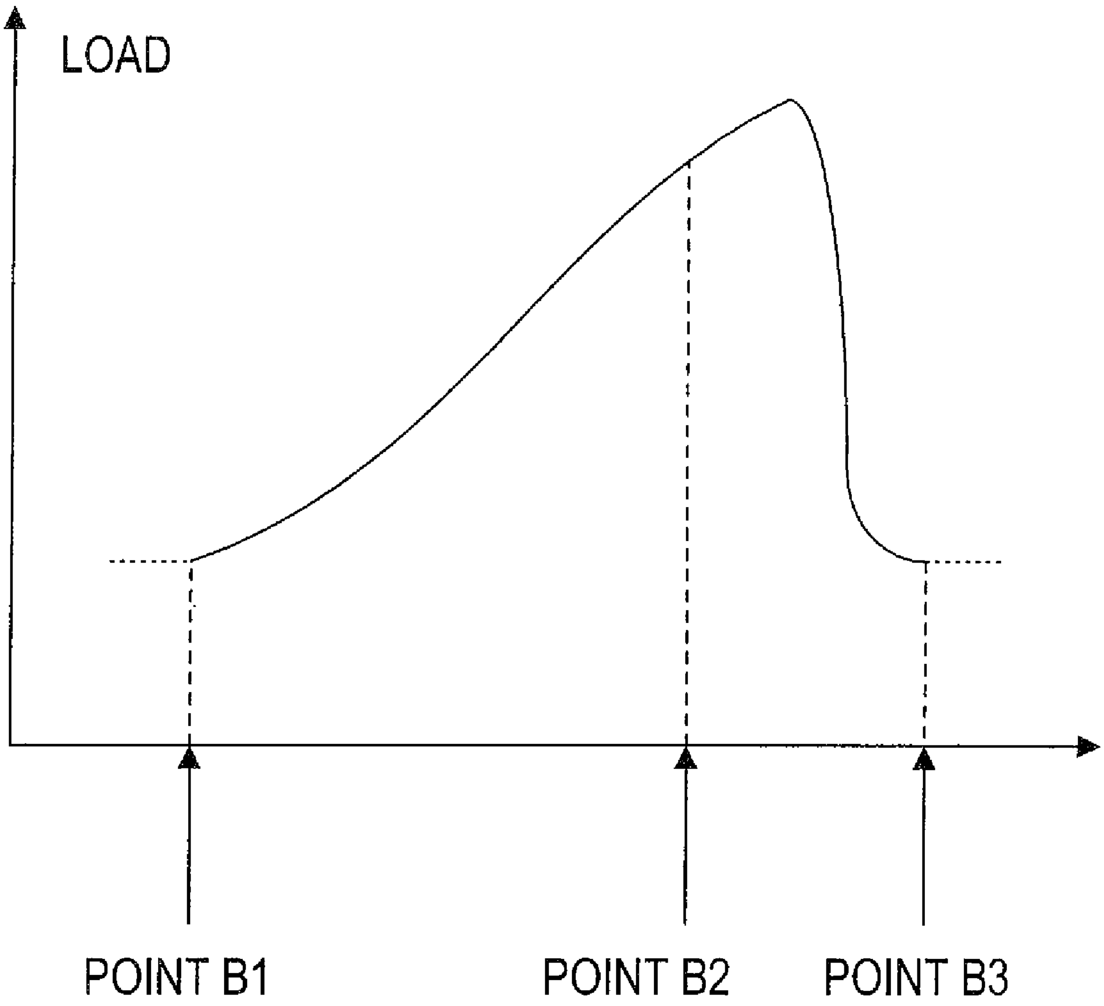
FIG. 11 is a graph showing a fluctuation of load applied to the CR motor when the recording head contacts with the pump operation member and the pump operation member is moved.

When the carriage 41 is moved forward from a point B1, wherein the recording head 23 contacts with the pump operation member 95, the load initially increases in a gradual manner as shown in FIG. 11, since the shape of the pump operation member 95 is changed, as shown in FIGS. 5A-5B, while the pump operation member 95 is in a stationary state without moving forward. When the carriage 41 is at a point B2, wherein the pump operation member 95 can no longer maintain the stationary state which has been kept due to friction, the pump operation member 95 is instantly moved forward by the restoring force of the pump operation member 95 for being restored from the bending. When the carriage 41 is at a point B3, wherein the movement of the pump operation member 95 is initiated, the load applied to the CR motor 43 suddenly decreases.

The CR motor control unit 31*a* according to the present embodiment performs the motor control process such that the speed of the carriage 41 does not change to a large extent even when such load fluctuation is caused.

As shown in FIG. 7, when the motor process is initiated, in S110, the CR motor control unit 31*a* sets the amount Ikeep of current inputted into the CR motor 43, which is set when the carriage 41 is moved forward, to a value Ikeep0 (Ikeep0 is a positive value). The value Ikeep0 is predetermined in a designing stage of the printer 1. The CR motor control unit 31*a* also sets the values of a parameter M and a parameter F to zero.

Subsequently, in S120, the CR motor control unit 31*a* sets the value of a parameter Pback_pos to the current positional coordinate of the carriage 41 indicated by the CR position counter 31*b*. In S130, the CR motor control unit 31*a* sets the values of parameters P(0), P(1), P(2), . . . , P(i), . . . , P(n) to the values equivalent to the value of the parameter Pback_pos. Then, the process proceeds to S140.

For the parameter Pback_pos, the positional coordinate of the carriage 41 immediately before a receding is set if the carriage 41 is moved backward. For the parameter P(i), the preceding positional coordinate of the carriage 41 (n−i)cycle ago is set wherein P(n) is the current positional coordinate of the carriage 41. The values of the parameters Ikeep, M, F, Pback_pos, P(i) {i: i=0, 1, 2, . . . , n} are stored in a memory unit (not shown) of the CR motor control unit 31*a*. The above-described value n is arbitrarily determined in the designing stage based on the values of invariables Sv1, Sv2, which will be described later.

In S140, the CR motor control unit 31*a* sets the amount I of the current inputted into the CR motor 43 to a value I0 (I0 is a positive value), and controls the CR motor 43 with a current in the amount I=I0 through the CR motor driving circuit 51. Then, the process proceeds to S150. The value I0 is determined to be a certain value in the designing stage, depending on the degree of the static friction of the carriage 41, so that the carriage 41 is not moved even when the CR motor 43 is driven by a current in the amount I=I0.

In S150, the CR motor control unit 31*a* performs a process so as to renew the value of the parameter P(0) to the current value of the parameter P(1), the value of the parameter P(1) to the current value of the parameter P(2), and so on. That is, the CR motor control unit 31*a* performs a process so as to renew the value of the parameter P(i) to the current value of the parameter P(i+1) (i.e. P(i)←P(i+1)) with respect sequentially to parameters i=0 to i=n−1. Moreover, the CR motor control unit 31*a* renews the value of parameter P(n) to the value of the current positional coordinate of the carriage 41 indicated by the CR position counter 31*b*. Accordingly, the CR motor control unit 31*a* stores the locus of the positional coordinates of the carriage 41 in a discrete manner from the current positional coordinate to the preceding positional coordinate in n-cycle ago as the parameter P(i).

Subsequently in S160, it is determined whether or not the carriage 41 has reached the capping position Pref of the recording head 23 based on the value of the parameter P(n). That is, it is determined whether or not P(n)=Pref.

If it is determined that the carriage 41 has not yet reached the capping position Pref (S160:No), the process proceeds to S170 wherein it is determined whether or not the carriage 41 has been moved backward based on the respective values of parameters P(n), P(n−1).

Specifically, the determination in S170 whether or not the carriage 41 has been moved backward is made by determining whether or not the value of the parameter P(n), indicating the current positional coordinate of the carriage 41, is smaller than the value of the parameter P(n−1), indicating the preceding positional coordinate of the carriage 41 one cycle ago.

Figure 8:
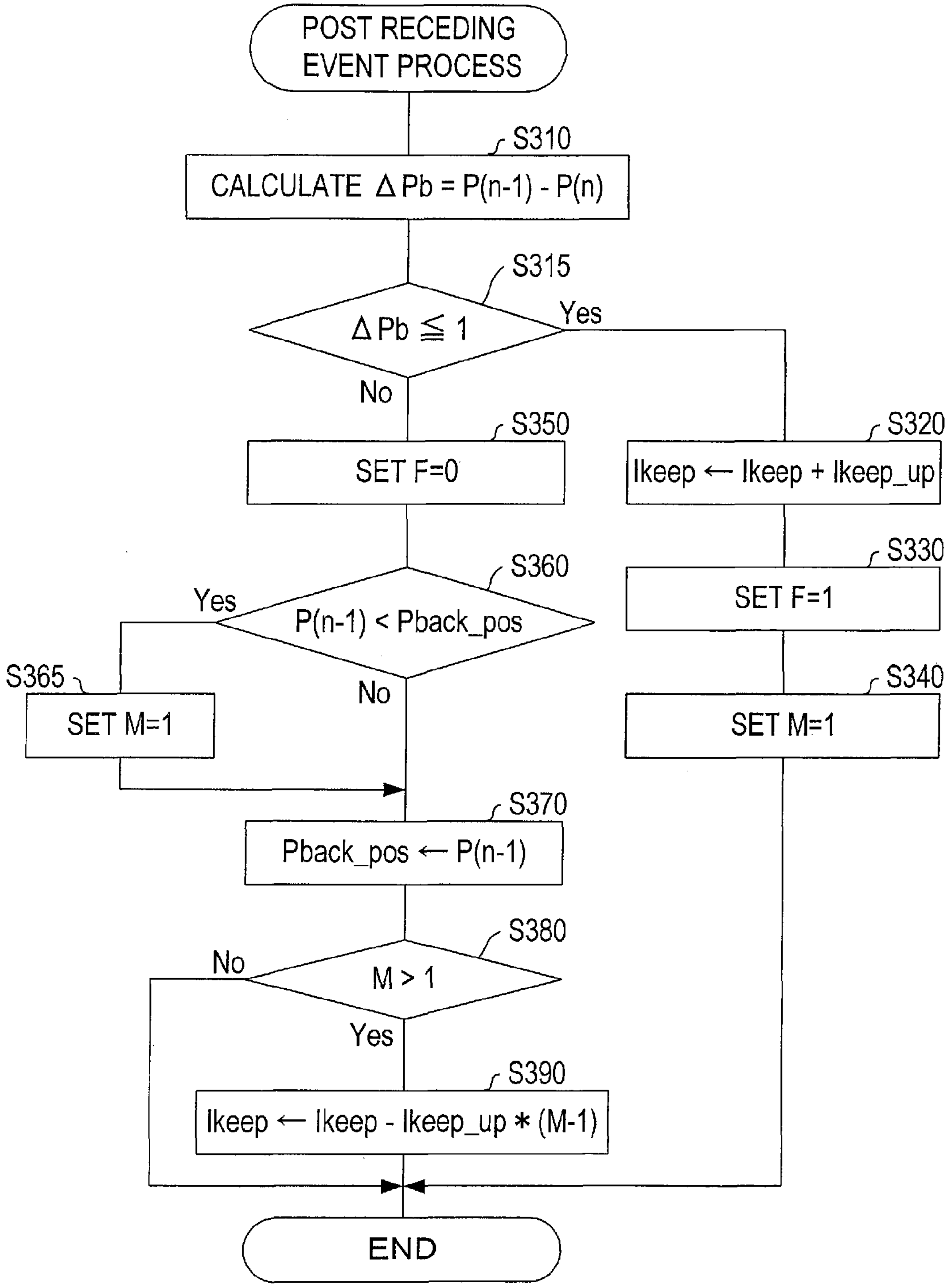
FIG. 8 is a flowchart describing a post receding event process performed by the CR motor control unit.

If it is determined that the carriage 41 has been moved backward (S170:Yes), the process proceeds to S180 wherein a post receding event process, shown in FIG. 8, is performed. After the post receding event process is performed, the process goes back to S150 wherein the value of the parameter P(i) is renewed, and then the processes in S160 and the following steps are performed.

On the other hand, if it is determined that the carriage 41 has not been moved backward (S170:No), the process proceeds to S190 wherein it is determined whether or not the carriage 41 has been moved forward based on the respective values of the parameters P(n), P(n−1).

Specifically, the determination in S190 whether or not the carriage 41 has been moved forward is made by determining whether or not the value of the parameter P(n), indicating the current positional coordinate of the carriage 41, is larger than the value of the parameter P(n−1), indicating the preceding positional coordinate of the carriage 41 one cycle ago.

Figure 9:
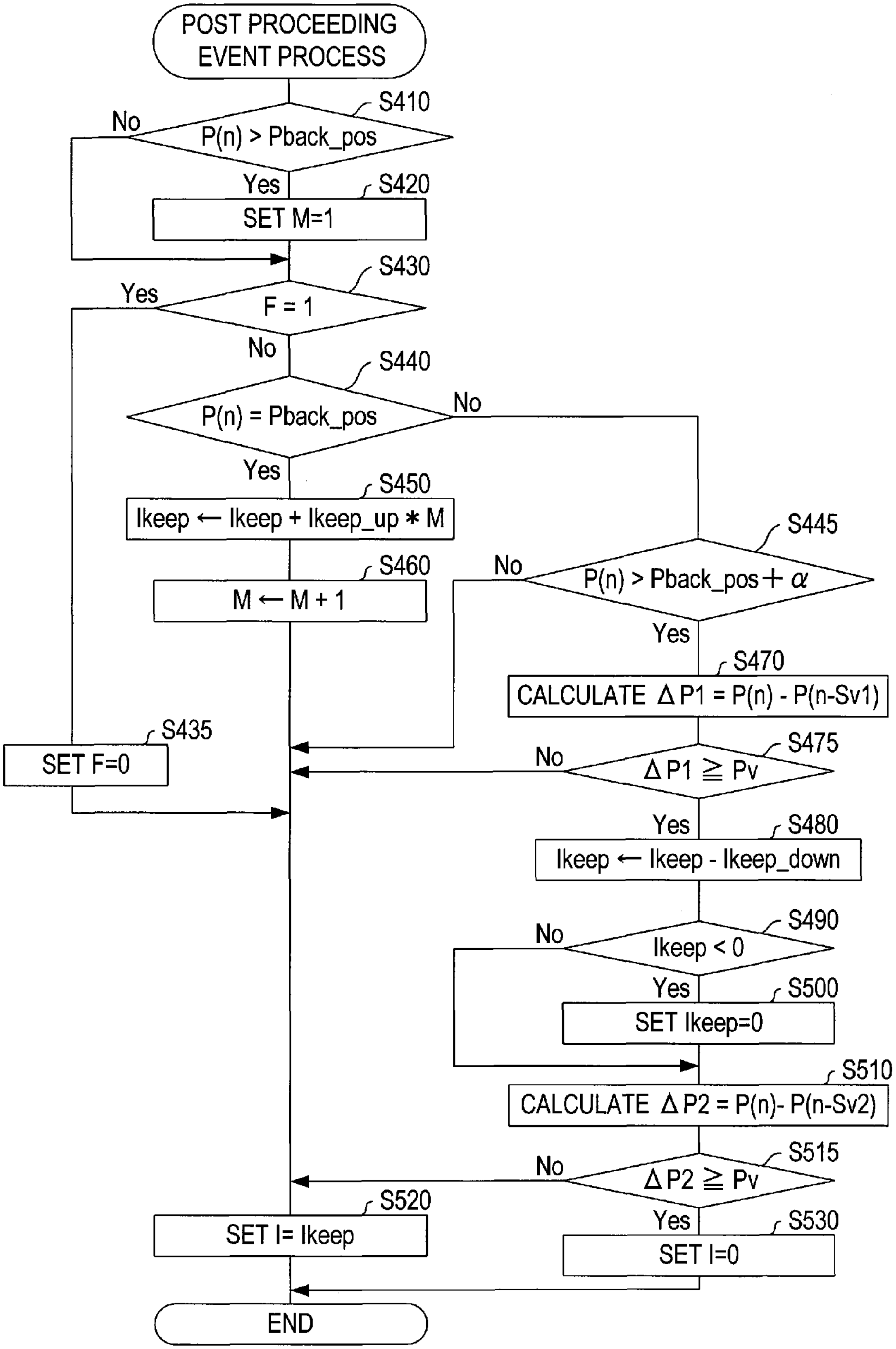
FIG. 9 is a flowchart describing a post proceeding event process performed by the CR motor control unit.

If it is determined that the carriage 41 has been moved forward (S190:Yes), the process proceeds to S200 wherein a post proceeding event process, shown in FIG. 9, is performed. After the post proceeding event process is performed, the process goes back to S150 wherein the value of the parameter P(i) is renewed, and the processes in S160 and the following steps are performed.

On the other hand, if it is determined that the carriage 41 has not been moved forward (S190:No), the process proceeds to S210. In S210, the CR motor control unit 31*a* sets the amount I of the current inputted into the CR motor 43 to I'=(I+Iinc), which is obtained by adding a predetermined amount Iinc (Iinc is a positive value) to the present amount I, and controls the CR motor 43 through the CR motor driving circuit 51 with an current in the amount I'=I+Iinc.

Subsequently, the process goes back to S150, wherein the CR motor control unit 31*a* renews the value of the parameter P(i), and processes in S160 and the following steps are performed. When it is determined, in S160, that the carriage 41 has reached the capping position Pref of the recording head 23 (S160:Yes), the process proceeds to S165 wherein the CR motor control unit 31*a* sets the amount I of the current inputted to the CR motor 43 to zero. Then, the motor control process is over.

The following describes the post receding event process performed in S180 by the CR motor control unit 31*a* with reference to FIG. 8.

When the post receding event process is initiated, in S310, based on the value of the parameter P(n), indicating the current positional coordinate of the carriage 41, and the value of the parameter P(n−1), indicating the preceding positional coordinate of the carriage 41 one cycle ago, the CR motor control unit 31*a* calculates a receding distance ΔPb of the carriage 41 since the previous cycle.

$$\Delta Pb=P(n-1)-P(n)$$

Subsequently, in S315, it is determined whether or not the receding distance ΔPb is equal to or smaller than 1. If it is determined that the receding distance ΔPb of the carriage 41 since the previous cycle is equal to or smaller than 1 (S315: Yes), the process proceeds to S320. In S320, the value of the parameter Ikeep is renewed to a value obtained by adding a predetermined amount Ikeep_up (Ikeep_up is a positive value) to the current value of the parameter Ikeep (i.e. Ikeep←Ikeep+Ikeep_up).

Subsequently, the CR motor control unit 31*a* sets the parameter F to F=1 in S330, and sets the parameter M to M=1 in S340. After these processes are performed, the post receding event process is over.

On the other hand, if it is determined that the receding distance ΔPb of the carriage 41 since the previous cycle is larger than 1 (S315:No), the process proceeds to S350 wherein the parameter F is set to F=0. Subsequently, in S360, it is determined whether or not the preceding positional coordinate P(n−1) of the carriage 41 immediately before the receding is smaller than the value of the parameter Pback_pos.

That is, it is determined whether or not the current state of the carriage 41 is such that the carriage 41 has been once moved backward, and then, before the carriage 41 reaches the position where the carriage 41 has been positioned immediately before the receding, the carriage 41 is moved backward again. In the present embodiment, such situation does not basically happen wherein the carriage 41 is overcome by the load and moved backward once and then, before the carriage 41 reaches the position immediately before the receding, the carriage 41 is again moved backward. However, the determination described above is made, if some abnormal situation develops, so as to perform an error handling process wherein the value of the parameter M is reset to M=1.

If it is determined that the positional coordinate P(n−1) of the carriage 41 immediately before the receding is smaller than the value of the parameter Pback_pos (S360:Yes), the process proceeds to S365, wherein the parameter M is set to M=1, and then to S370.

On the other hand, if it is determined that the positional coordinate P(n−1) of the carriage 41 immediately before the receding is equal to or larger than the value of the parameter Pback_pos (S360:No), the process proceeds directly to S370 without the process of S365 being performed.

In S370, the CR motor control unit 31*a* renews the value of the parameter Pback_pos to the value of the parameter P(n−1) indicating the positional coordinate of the carriage 41 immediately before the receding. Then, the process proceeds to S380.

In S380, it is determined whether or not the value of the parameter M is larger than 1. If it is determined M>1 (S380: Yes), the process proceeds to S390, wherein the value of the parameter Ikeep is renewed to a value obtained by subtracting a value (Ikeep_up*(M−1)) from the current value of the parameter Ikeep (i.e. Ikeep←Ikeep−Ikeep_up*(M−1)).

The printer 1 according to the present embodiment is configured such that the initial value Ikeep is increased (see S450 in FIG. 9, the detail of which will be explained later), when the carriage 41 is moved backward from the position Pback_pos and subsequently the carriage 41 is moved forward and returns to the previous position Pback_pos. The process in S390 is performed, in a case wherein the carriage 41 is moved backward again even if the CR motor 43 is driven by a current in the initial amount Ikeep increased as described above, in order to renew the initial value Ikeep to the value prior to the increase. After the CR motor control unit 31*a* performs such process in S390, the post receding event process is over, and the process goes back to S150.

On the other hand, if it is determined M≦1 (S380:No), the post receding event process is over without the CR motor control unit 31*a* performing the process in S390, and the process goes back to S150.

The following describes a post proceeding event process performed by the CR motor control unit 31*a* in S200 with reference to FIG. 9.

When the post proceeding event process is initiated, in S410, it is determined whether or not the carriage 41 has been moved forward beyond the position Pback_pos. Specifically, it is determined whether or not the value of the parameter P(n), indicating the current positional coordinate of the carriage 41, is larger than the value of the parameter Pback_pos.

If it is determined that the carriage 41 has been moved forward beyond the position Pback_pos (S410:Yes), the process proceeds to S420, wherein the parameter M is set to M=1, and then to S430. On the other hand, if it is determined that the carriage 41 has not been moved forward beyond the position Pback_pos (S410:No), the process proceeds to S430 without the process in S420 being performed.

In S430, it is determined whether or not the value of the parameter F is F=1. If it is determined that the value of the parameter F is not F=1 (S430:No), the process proceeds to S440.

In S440, if it is determined whether or not the carriage 41 is located at the position Pback_pos, to which the carriage 41 has been previously receded, based on the value of the parameter P(n). If it is determined that the carriage 41 is located at the position Pback_pos (S440:Yes), the process proceeds to S450. On the other hand, if it is determined that the carriage 41 is not located at the position Pback_pos (S440:No), the process proceeds to S445.

In S450, the CR motor control unit 31*a* renews the value of the parameter Ikeep to a value obtained by adding the value (M*Ikeep_up) to the current value of the parameter Ikeep (i.e.

Ikeep←Ikeep+Ikeep_up*M). Subsequently, the process proceeds to S460, wherein the value of the parameter M is renewed by adding 1 to the current value of the parameter M, and then to S520.

In S520, the CR motor control unit 31*a* changes the amount I of the current inputted to the CR motor 43 to the initial value Ikeep, and controls the CR motor 43 through the CR motor driving circuit 51 with a current in the amount I=Ikeep. Then, the post proceeding event process is over, and the process goes back to S150.

On the other hand, if it is determined that the value of the parameter F is F=1 (S430:Yes), the process proceeds to S435 wherein the CR motor control unit 31*a* sets the value of the parameter F to F=0. Then, without the processes S440-S460 being performed, the process proceeds to S520 wherein the CR motor control unit 31*a* controls the CR motor 43 through the CR motor driving circuit 51 with a current in the amount I=Ikeep. When an affirmative determination is made in S430, the value of the parameter Ikeep has been renewed in S320. Therefore, the CR motor control unit 31*a* controls the CR motor 43 in S520 with a current in the amount I at the initial value Ikeep renewed in S320. After the process in S520 is performed as described above, the CR motor control unit 31*a* finishes the post proceeding event process, and the process goes back to S150.

On the other hand, in S445, if it is determined whether or not the current position P(n) of the carriage 41 is beyond a position which is a predetermined distance a further forward from the position Pback_pos (i.e. Pback_pos+α). The invariable α can be arbitrarily set by an engineer of the printer 1 to zero or to a positive value. In the present embodiment, if the moving speed Vn of the carriage 41 is high, a process so as to reduce the initial value Ikeep is performed. However, if the initial value Ikeep is decreased immediately after the initial value Ikeep is increased even though the carriage 41 is moved forward, the carriage 41 is likely to be moved backward again. The determination in S445 is made so as to avoid such situation.

If it is determined that the current position P(n) of the carriage 41 is beyond the position (Pback_pos+α) (S445: Yes), the process proceeds to S470. On the other hand, if it is determined that the current position P(n) of the carriage 41 is not beyond the position (Pback_pos+α) (S445:No), the process proceeds to S520. In S520, the CR motor control unit 31*a* controls the CR motor 43 with a current in the amount I at the currently set initial value Ikeep.

In S470, the CR motor control unit 31*a* performs the following process. That is, based on the current position P(n) of the carriage 41 and a preceding position P(n−Sv1) of the carriage 41 Sv1-cycle ago, the CR motor control unit 31*a* calculates the displacement distance ΔP1 of the carriage 41 caused within a period of time (Ts*Sv1). Ts mentioned here is the time required for one cycle, that is, the cycle length until S150 is subsequently performed. The value Sv1 is an invariable determined in the designing stage.

$$\Delta P1=P(n)-P(n-Sv1)$$

Subsequently, the process proceeds to S475 wherein it is determined whether or not the displacement distance ΔP1 is equal to or larger than a reference value Pv. The value Pv is an invariable determined in the designing stage (Pv=2 in the present embodiment).

In other words, in S475, it is determined whether or not the moving speed Vn of the carriage 41 is equal to or larger than a first reference speed Vth1, which is obtained by the following formula. In the formula, an invariable L indicates the interval between slits of the CR encoder 53, and represents the distance which the CR position counter 31*b* counts as one positional coordinate. It is to be noted that a positional coordinate is an integer in the present embodiment.

$$Vth1=(Pv*L)/(Sv1*Ts)$$

If it is determined that the displacement distance ΔP1 is smaller than the reference value Pv (S475:No), the process proceeds to S520 wherein the CR motor control unit 31*a* changes amount I of the current, inputted into the CR motor 43, to the current value of the parameter Ikeep, and controls the CR motor 43 through the CR motor driving circuit 51 with a current in the amount I=Ikeep. Then the post proceeding event process is over. In other words, if the moving speed Vn of the carriage 41 is determined to be smaller than the first reference speed Vth1, a process is performed, wherein the amount I of the current inputted into the CR motor 43 is changed to the initial value Ikeep which is equivalent to the previous initial value Ikeep, basically every time the carriage 41 is determined to be moved forward.

On the other hand, if it is determined that the displacement distance ΔP1 is equal to or larger than the reference value Pv (in other words, if it is determined that the moving speed Vn of the carriage 41 is equal to or larger than the first reference speed Vth1) (S475:Yes), the process proceeds to S480 wherein the CR motor control unit 31*a* renews the value of the parameter Ikeep by subtracting a predetermined value Ikeep_down from the current value of the parameter Ikeep. The subtracting value Ikeep_down is a positive invariable predetermined by an engineer in the designing stage.

Subsequently, in S490, it is determined whether or not the latest value of the parameter Ikeep renewed in S480 is a negative value. If it is determined that the latest value of the parameter Ikeep is a negative value (S490:Yes), the process proceeds to S500 wherein the value of the parameter Ikeep is renewed to zero, which is the lowest value (Ikeep=0). Then, the process proceeds to S510.

On the other hand, if it is determined that the latest value of the parameter Ikeep is zero or a positive value (S490:No), the process proceeds to S510 without the CR motor control unit 31*a* performing the process in S500.

In S510, the CR motor control unit 31*a* calculates the displacement distance ΔP2 of the carriage 41 caused in a period of time (Ts*Sv2) based on the current position P(n) of the carriage 41 and a preceding position P(n−Sv2) of the carriage 41 Sv2-cycle ago. The value of Sv2 is an invariable determined in the designing stage so as to be smaller than the invariable Sv1.

$$\Delta P2=P(n)-P(n-Sv2)$$

Subsequently, in S515, it is determined whether or not the displacement distance ΔP2 is equal to or larger than the reference value Pv. In other words, in S515, it is determined whether or not the moving speed Vn of the carriage 41 is equal to or larger than a second reference speed Vth2, which is larger than the first reference speed Vth1, and obtained by the following formula.

$$Vth2=(Pv*L)/(Sv2*Ts)$$

If it is determined that the displacement distance ΔP2 is smaller than the reference value Pv (S515:No), the process proceeds to S520 wherein the CR motor control unit 31*a* changes the amount I of the current inputted into the CR motor 43 to the initial value Ikeep, and controls the CR motor 43 with a current in the amount I=Ikeep. Then, the post proceeding event process is over, and the process goes back to S150.

That is, when the moving speed Vn of the carriage 41 is equal to or larger than the first reference speed Vth1 and smaller than the second reference speed Vth2, the CR motor control unit 31*a* changes the current amount I to the initial value Ikeep, which is decreased by the predetermined amount Ikeep_down in S480, so that the moving speed Vn of the carriage 41 is not increased.

On the other hand, if it is determined that the displacement distance ΔP2 is equal to or larger than the reference value Pv (S515:Yes), the process proceeds to S530 wherein the CR motor control unit 31*a* sets the amount I of the current inputted into the CR motor 43 to zero (I=0). That is, in the present embodiment, if the moving speed Vn of the carriage 41 is equal to or larger than the second reference speed Vth2, the moving speed Vn of the carriage 41 is determined to be abnormal, and the amount I of the current inputted into the CR motor 43 is temporarily set to zero so as to reduce the moving speed Vn of the carriage 41. Then, the post proceeding event process is over, and the process goes back to S150.

The above has described the structure and the operation of the printer 1 according to the present embodiment. In the printer 1 according to the present embodiment, if the carriage 41 is moved backward when the load applied to the CR motor 43 suddenly increases and the amount I of the current inputted into the CR motor 43 is changed to the initial value Ikeep, the increase of the load is handled by increasing the initial value Ikeep.

Figure 12:
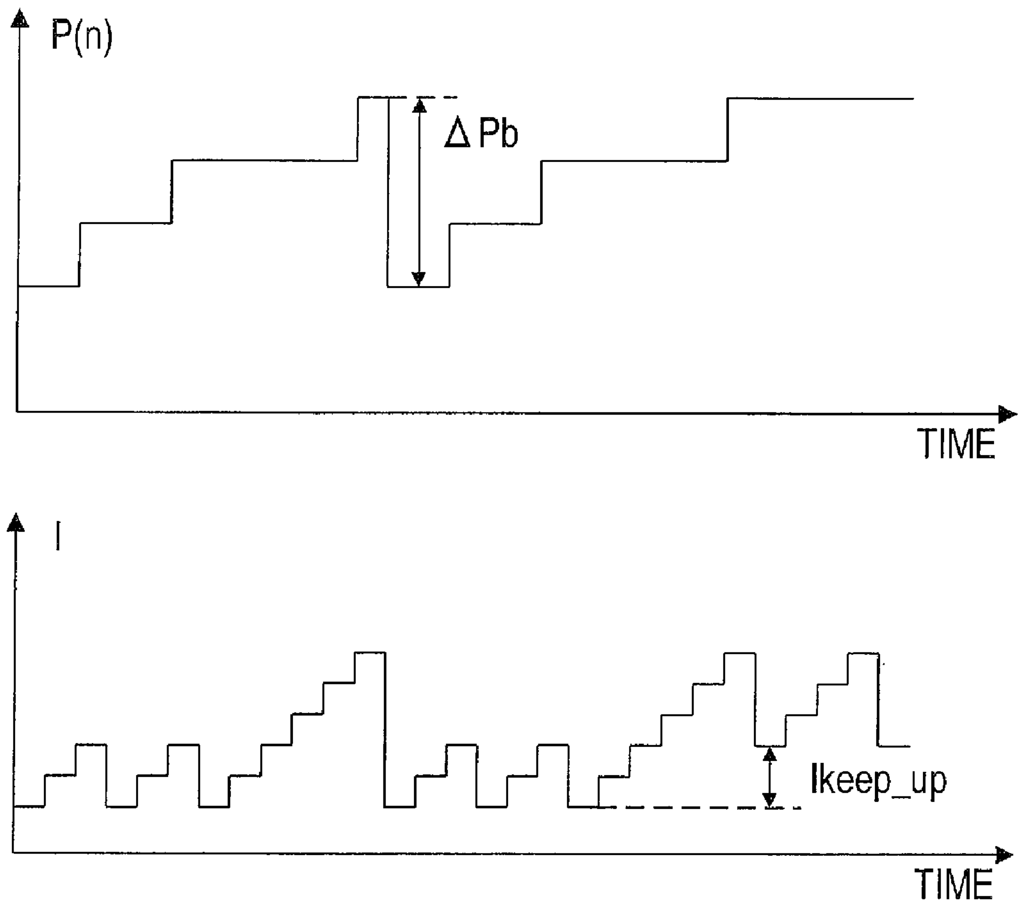
FIG. 12 shows a graph indicating a change in the position of the carriage, and a graph indicating a change in the amount of current inputted into the CR motor, which occurs in relation to the change in the position of the carriage.

However, in the present embodiment, if the receding distance is large, the initial value Ikeep is not increased, as seen from the graphs in FIG. 12, until the carriage 41 returns to the position Pback_pos where the carriage 41 has been located immediately before the receding.

In other words, the value of the parameter Ikeep is increased when the carriage 41 reaches the position Pback_pos where the carriage 41 has been located immediately before the receding, and the amount I of the current inputted into the CR motor 43 is changed to the increased initial value Ikeep. An increase of load is handled in this manner in the present embodiment.

An increase of load could be alternatively handled in such a way that the initial value Ikeep is increased as soon as the carriage 41 is moved backward. However, if such method is adopted, the initial value Ikeep is increased before the load increases, and the speed of the carriage 41 is likely to be accelerated before the carriage 41 reaches the position Pback_pos where the carriage 41 has been located immediately before the receding. In addition, if the carriage 41 passes the position Pback_pos in an accelerated state, the carriage 41 is likely, in some cases, to be swiftly moved to the capping position and to damage the nozzle surface of the recording head 23.

In contrast, in the present embodiment, even if the carriage 41 is moved backward, increasing the initial value Ikeep is suspended until the carriage 41 reaches the position Pback_pos where the carriage 41 has been located immediately before the receding. Therefore, accelerating the speed of the carriage 41 before the carriage 41 reaches the position Pback_pos can be inhibited, which can consequently inhibit a failure in moving the carriage 41 to the capping position at a minimal speed.

According to the present embodiment, when the load suddenly increases, regardless of a fluctuation of the load, the carriage 41 can be more suitably moved at a minimal speed as compared to a conventional technique. Therefore, for example, the nozzle surface of the recording head 23 can be inhibited from being damaged.

Moreover, in the present embodiment, when the receding distance of the carriage 41 is ΔPb=1, the value of the parameter Ikeep is immediately increased, without waiting for the carriage 41 to reach the position Pback_pos where the carriage 41 has been located immediately before the receding. Therefore, according to the present embodiment, the process can be simplified when the receding distance ΔPb of the carriage 41 is very small.

Furthermore, in the present embodiment, if the carriage 41 is moved backward again due to a sudden increase of the load although the CR motor 43 is driven by a current in which the initial value Ikeep is increased, the initial value Ikeep is increased in a step-by-step manner until the carriage 41 is no longer moved backward. Therefore, in the present embodiment, the carriage 41 can be more stably moved to the capping position at a minimal speed as compared to a case wherein the initial value Ikeep is suddenly increased at once.

Figure 13A:
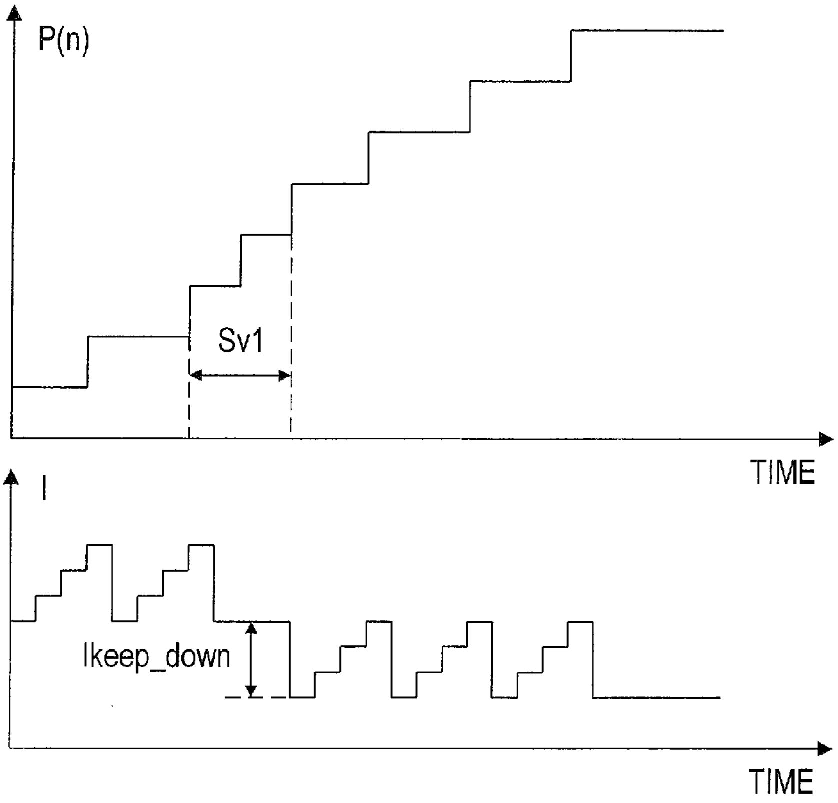
FIG. 13A shows a graph indicating a change in the position of the carriage when the moving speed of the carriage is equal to or larger than a first reference speed, and a graph indicating a change in the amount of current inputted into the CR motor, which occurs in relation to the change in the position of the carriage.
Figure 13B:
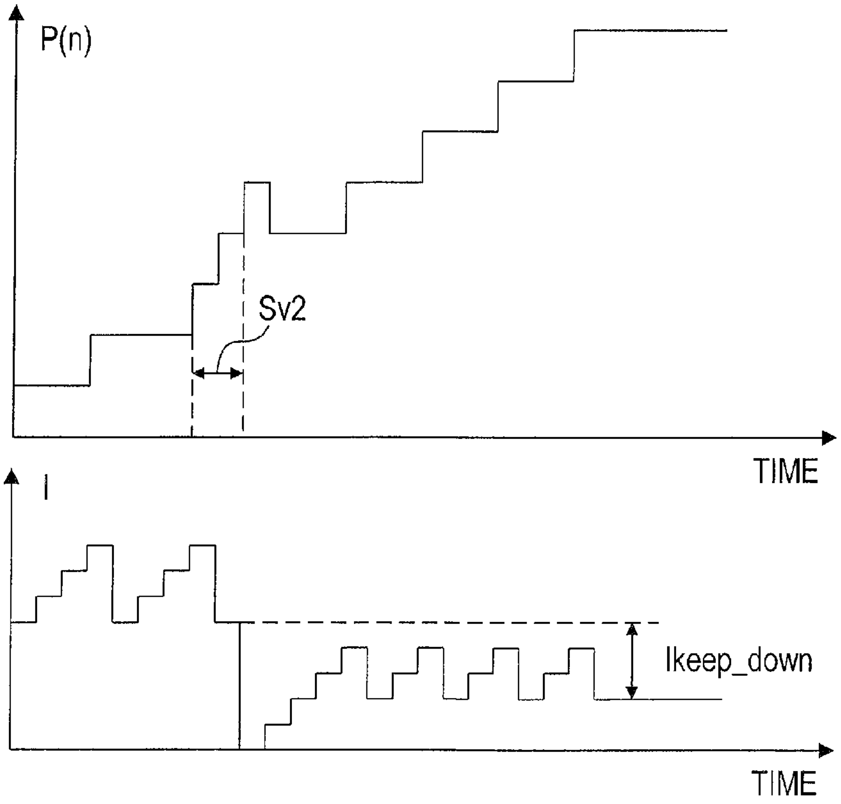
FIG. 13B shows a graph indicating a change in the position of the carriage when the moving speed of the carriage is equal to or larger than a second reference speed, and a graph indicating a change in the amount of current inputted into the CR motor, which occurs in relation to the change in the position of the carriage.

Still furthermore, in the present embodiment, when the moving speed Vn of the carriage 41 becomes equal to or larger than the first reference speed Vth1, as shown in FIG. 13A, the initial value Ikeep is decreased so as to reduce the moving speed Vn of the carriage 41. When the moving speed Vn of the carriage 41 is equal to or larger than the second reference speed Vth2, which is larger than the first reference speed Vth1, as shown in FIG. 13B, the amount I of the current inputted into the CR motor 43 is temporarily decreased to zero so as to reduce the moving speed Vn of the carriage 41.

Therefore, according to the present embodiment, even if the load suddenly decreases, the carriage 41 can be stably moved to the capping position at a minimal speed. As a result, according to the present embodiment, a reduction of the load can be appropriately handled, and the nozzle surface of the recording head 23 can be inhibited from being damaged, which can be caused by the carriage 41 being moved at a high speed.

Moreover, in the present embodiment, the locus of the positional coordinates P(n)-P(0) of the carriage 41 is stored, and the displacement distance ΔP1, which is the distance the carriage 41 is displaced within a period of the predetermined time (Sv1*Ts), is calculated. Based on the displacement distance ΔP1, a determination whether or not the moving speed Vn of the carriage 41 is equal to or larger than the first reference speed Vth1 is made. Therefore, according to the present embodiment, in order to determine the speed of the carriage 41, no additional sensor (hardware) for speed detection is necessary apart from the encoder. As a result, the printer 1, to which the present invention is applied, can be made inexpensively.

The present invention is not limited to the above-described embodiment, but can be carried out in various ways. For example, although the above-described embodiment describes an example in which the present invention is applied to the printer 1 wherein the carriage 41 and the recording head 23 are conveyed by the CR motor 43, the present invention can be applied not only to a device that conveys the carriage 41, but also to various devices of other kinds.

Moreover, in the above-described embodiment, in a case wherein the carriage 41 is moved backward for a receding distance ΔPb which is larger than 1, increasing the initial value Ikeep is suspended until the carriage 41 reaches the position Pback_pos where the carriage 41 has been located immediately before receding. However, the initial value Ikeep can be increased when the carriage 41 is in a position before the position Pback_pos.

Although a specific embodiment has been illustrated and described herein, it is to be understood that the above description is intended to be illustrative, and not restrictive. Combinations of the above embodiment and other embodiments will be apparent to those of skill in the art upon reviewing the above description. The scope of the invention includes any other applications in which the above structures are used. Accordingly, the scope of the invention should only be determined with reference to the appended claims, along with the full scope of equivalents to which such claims are entitled.

What is claimed is:

1. A motor driving device that drives a DC motor, the motor driving device comprising:

a motor driving unit that repeatedly performs a changeover, wherein the motor driving unit changes an amount of a current inputted into the DC motor to an initial value at a predetermined timing, and then gradually increases the amount of the current from the initial value, in order to slowly move a driving target, driven by rotational force of the DC motor, in a moving direction;

a status determination unit that determines whether or not the driving target is in a predetermined status; and an initial value renewal unit that changes the initial value when the status determination unit determines that the driving target is in the predetermined status, wherein the status determination unit comprises a reverse movement determination unit that determines whether or not the driving target is moved in a reverse direction, which is a direction opposite to the moving direction, and wherein, when the reverse movement determination unit determines that the driving target is moved in the reverse direction, the initial value renewal unit changes the initial value to a value larger than a current value.

2. The motor driving device according to claim 1 wherein the motor driving unit changes the amount of the current to the initial value when the driving target is moved in the moving direction for a predetermined distance.

3. The motor driving device according to claim 1, wherein the initial value renewal unit comprises an arrival determination unit that determines, when the reverse movement determination unit determines that the driving target is moved in the reverse direction, whether or not the driving target, which is moved in the reverse direction, is conveyed by the motor driving unit in the moving direction and has reached a position of the driving target prior to the reverse movement, and wherein, when the arrival determination unit determines that the driving target has reached the position prior to the reverse movement, the initial value renewal unit changes the initial value to a value larger than a current value.

4. The motor driving device according to, claim 3 further comprising an incremental amount renewal unit that changes an incremental amount of the initial value increased by the initial value renewal unit, when the motor driving unit drives the DC motor by a current in the amount at the initial value increased by the initial value renewal unit, and if the reverse movement determination unit determines again that the driving target is moved in the reverse direction, wherein, when the motor driving unit drives the DC motor by the current in the amount at the initial value increased by the initial value renewal unit, and if the reverse movement determination unit determines again that the driving target is moved in the reverse direction, the initial value renewal unit changes the initial value increased by the initial value renewal unit to the initial value used when the driving target initially reaches the position prior to the reverse movement, and, when the driving target reaches the position prior to the reverse movement, the initial value renewal unit changes the initial value to a value which is larger than a current value by the incremental amount specified by the incremental amount renewal unit.

5. The motor driving device according to claim 3 wherein, when a reverse movement distance of the driving target from the position prior to the reverse movement is smaller than a predetermined distance, the initial value renewal unit changes the initial value to a value larger than a current value without a determination made by the arrival determination unit.

6. The motor driving device according to claim 3 further comprising:

a position detection unit that detects a position of the driving target; and a position storing unit that stores a position of the driving target when the position detection unit detects a position of the driving target, wherein the arrival determination unit determines a position of the driving target, which is stored by the position storing unit immediately before the driving target is moved in the reverse direction, as the position prior to the reverse movement.

7. The motor driving device according to claim 1, wherein, when the motor driving unit drives the DC motor by a current in the amount at the initial value, which is increased by the initial value renewal unit, and if the reverse movement determination unit determines that the driving target is moved again in the reverse direction, the initial value renewal unit changes the initial value to a value which is larger than the initial value used immediately before the driving target is moved again in the reverse direction.

8. The motor driving device according to claim 7, wherein the initial value renewal unit comprises an arrival determination unit that determines, when the reverse movement determination unit determines that the driving target is moved in the reverse direction, whether or not the driving target, which is moved in the reverse direction, is conveyed by the motor driving unit in the moving direction and has reached a position of the driving target prior to the reverse movement, and wherein, when the arrival determination unit determines that the driving target has reached the position prior to the reverse movement, the initial value renewal unit changes the initial value.

9. The motor driving device according to claim 1, wherein the status determination unit comprises a speed determination unit that determines whether or not a moving speed of the driving target is equal to or larger than a predetermined reference speed, and wherein, when the speed determination unit determines that the moving speed of the driving target is equal to or larger than the reference speed, the initial value renewal unit changes the initial value to a value smaller than a current value.

10. The motor driving unit according to claim 1 further comprising a detection unit which detects that the driving target is moved for a predetermined distance, wherein, when the detection unit detects that the driving target is moved for the predetermined distance, the motor driving unit changes the amount of the current to the initial value.

11. The motor driving device according to claim 10 further comprising an encoder that outputs a pulse signal in correspondence with a movement of the driving target, wherein the detection unit detects that the driving target is moved for the predetermined distance based on the signal outputted by the encoder.

12. The motor driving device according to claim 11 further comprising:

a position calculation unit that calculates a position of the driving target based on the signal outputted by the encoder;

a control device that stores a locus of positions of the driving target calculated by the position calculation unit; and a control device that calculates a displacement distance in which the driving target is moved in a predetermined period of time based on the locus of the positions stored by the control device, wherein the speed determination unit determines whether or not the moving speed of the driving target is equal to or larger than the reference speed based on the displacement distance calculated by the displacement distance calculation unit.

13. The motor driving device according to claim 1 wherein the motor driving device is provided to a driving mechanism that moves the driving target in the moving direction.

14. The motor driving device according to claim 1, wherein driving mechanism is a conveyance mechanism that conveys a carriage, carrying a recording head which ejects drops of ink from nozzles, as the driving target, and wherein the DC motor moves the carriage by applying rotational force of the DC motor to the carriage.

15. The motor driving device according to claim 14 wherein the motor driving unit starts operating when an image formation performed by the recording head finishes.

16. The motor driving device according to claim 14 wherein the motor driving unit starts operating when the carriage is moved to a home position.

17. The motor driving device according to claim 1 wherein an operation of the motor driving unit is initiated by the driving target passing a predetermined position.

18. The motor driving device according to claim 1, wherein the driving target is moved at least in the reverse direction by receiving an external load applied in the reverse direction, and wherein the external load is increased as the driving target is moved in the moving direction in a predetermined area.

19. A motor driving device that drives a DC motor, the motor driving device comprising:

a motor driving unit that repeatedly performs a changeover, wherein the motor driving unit changes an amount of a current inputted into the DC motor to an initial value at a predetermined timing, and then gradually increases the amount of the current from the initial value, in order to slowly move a driving target, driven by rotational force of the DC motor, in a moving direction;

a status determination unit that determines whether or not the driving target is in a predetermined status;

an initial value renewal unit that changes the initial value when the status determination unit determines that the driving target is in the predetermined status, wherein the status determination unit comprises a reverse movement determination unit that determines whether or not the driving target is moved in a reverse direction, which is a direction opposite to the moving direction, wherein, when the reverse movement determination unit determines that the driving target is moved in the reverse direction, the initial value renewal unit changes the initial value to a value larger than a current value, wherein the status determination unit comprises a speed determination unit that determines whether or not a moving speed of the driving target is equal to or larger than a predetermined reference speed, and wherein, when the speed determination unit determines that the moving speed of the driving target is equal to or larger than the reference speed, the initial value renewal unit changes the initial value to a value smaller than a current value; and an abnormal speed determination unit that determines whether or not the moving speed of the driving target is equal to or larger than a predetermined abnormal speed which is larger than the reference speed, wherein, when the abnormal speed determination unit determines that the moving speed of the driving target is equal to or larger than the abnormal speed, the motor driving unit temporarily changes the amount of the current inputted into the DC motor to zero, and then gradually increases the amount of the current until the driving target is moved for the predetermined distance.

* * * * *